United States Patent [19]

Tanino

[11] Patent Number: 4,589,059
[45] Date of Patent: May 13, 1986

[54] METHOD OF STARTING A CURRENT-FED INVERTER WITH SELF-EXCITATION

[75] Inventor: Morihiko Tanino, Yokahama, Japan

[73] Assignee: Neturen Co., Ltd., Tokyo, Japan

[21] Appl. No.: 593,249

[22] Filed: Mar. 22, 1984

[30] Foreign Application Priority Data

May 31, 1983 [JP] Japan .................................. 58-94846

[51] Int. Cl.[4] .......................................... H02M 5/458
[52] U.S. Cl. ...................................... 363/49; 323/901; 363/96
[58] Field of Search .................... 363/37, 49, 51, 96, 363/35; 323/901

[56] References Cited

U.S. PATENT DOCUMENTS 4,385,348 5/1983 Wisner .................................. 363/49
4,430,697 2/1984 Steinbruegge et al. ............... 363/49

Primary Examiner—Patrick R. Salce
Assistant Examiner—D. L. Rebsch
Attorney, Agent, or Firm—Wenderoth, Lind & Ponack

[57] ABSTRACT

A method of starting a current-fed inverter used as a high-frequency induction heating power supply and having a DC cut-off capacitor in the load circuit first supplies successive gate pulses which are spaced apart by small periods of time to a pair of thyristors of a power inverter unit until a turn-on current for the thyristors exceeds a latching current. When a voltage between output terminals of the power inverter unit reaches a predetermined thyristor reverse-biasing voltage, the successive gate pulses are no longer supplied to the thyristor pair. Then, successive gate pulses are supplied to a another pair of thyristors of the power inverter unit. The foregoing operation is repeated for successive thyristor pairs in a predetermined order until the period of oscillation of successive gate pulses supplied to the thyristor pairs is progressively shortened into conformity with a prescribed inverter oscillation period. With this method, no starter (with separate power supply) is required, and the prescribed inverter oscillation period can be quickly and reliably reached.

3 Claims, 9 Drawing Figures

METHOD OF STARTING A CURRENT-FED INVERTER WITH SELF-EXCITATION

BACKGROUND OF THE INVENTION

The present invention relates to a method of starting a current-fed inverter used as a high-frequency induction heating power supply and having a DC cut-off capacitor in a load circuit.

Typical current-fed inverters have as a current source a power rectifier unit for converting an AC power into a DC power under phase control. A direct current produced from the power rectifier is smoothed by a DC reactor and then supplied to a power inverter unit of the current-fed inverter. When the inverter is started, the energy flowing into an inverter load is reduced by the current suppressing action of the DC reactor. For high-frequency inverters, in particular, an insufficient reverse-biasing voltage is generated for turning off the thyristors of which the power inverter unit is composed.

FIG. 1(a) of the accompanying drawings illustrates a current-fed inverter comprising a power rectifier 10, a DC reactor Ld, a power inverter 20 composed of thyristors 21 through 24, for example, and an inverter load 30 composed of a resonance capacitor Ct, a load Lt and a resistor Rt which are connected to the resonance capacitor Ct. A starter M added to the current-fed inverter is composed of a thyristor S, a capacitor C, a resistor R, and a DC power supply E. For starting the inverter, a voltage from the DC power supply E is applied through the resistor R across the capacitor C. Then, the thyristor S and the thyristor 24 in the power inverter unit 20 are fired to impose across the resonance capacitor Ct a voltage of illustrated polarity corresponding to a reverse biasing voltage high enough to turn off the thyristors 21 through 24 of the power inverter unit 20. At this time, the thyristor S is turned off of its own accord. Thereafter, the thyristors 22, 23, then the thyristors 21, 24, and then the thyristors 22, 23 are fired to put the inverter into operation.

The foregoing prior method of supplying the inverter load 30 with starting energy for starting the current-fed inverter requires the starter M containing a separate power supply. Therefore, the entire inverter arrangement becomes large in size and is expensive to construct and install.

Another known arrangement, shown in FIG. 1(b), includes DC cut-off capacitors C1, C2 for preventing direct currents of a certain polarity from flowing into and being consumed by a resonance capacitor Ct and a load Lt and a resistor Rt connected in parallel to the resonance capacitor Ct, thereby maintaining a reverse biasing voltage. This method is effective for use in inverters of relatively low frequencies, but is less reliable for use in high-frequency inverters. To cope with this, it has been customary to employ the starter M for applying voltages across the DC cut-off capacitors C1, C2 to keep a reverse biasing voltage reliably.

There has been known a prior current-fed inverter having no starter and no DC cut-off capacitors. This type of current-fed inverter operates by detecting a voltage applied across the input terminals of the power inverter unit through the DC reactor, comparing the detected voltage with a preset voltage, and firing the non-conducting thyristors when the detected voltage exceeds the preset voltage by regarding the voltage across the resonance capacitor as reaching a reverse biasing voltage. At this time, gate pulses are delivered to the conducting thyristors at prescribed periods of oscillation of the inverter. The voltage across the input terminals of the power inverter unit is established when charges are accumulated in the resonance capacitor by currents flowing while the circuit is closed in short periods of time by the gate pulses until the accumulated charges reach the reverse biasing voltage. This process is free from the danger of commutation failure, but undergoes a slow starting operation, taking a long period of time before reaching the prescribed period of oscillation of the inverter. The arrangement is not suitable for use as a heating power supply for heating a workpiece up to a predetermined quenching temperature within a few seconds, or 10 through 30 seconds, for example.

SUMMARY OF THE INVENTION

With the prior problems in view, it is an object of the present invention to provide a method of starting a current-fed inverter, such as a high-frequency induction heating inverter, having DC cut-off capacitors in an inverter load, with a high degree of reliability without employing any starter.

Another object of the present invention is to provide a method of starting a current-fed inverter for high-frequency oscillation while reducing time required for reaching oscillation at a predetermined frequency and assuring reliable commutation.

According to the present invention, successive gate pulses which are spaced apart by small periods of time are supplied to a pair of the thyristors until a turn-on current for the thyristors exceeds a latching current. When a voltage between output terminals of the power inverter unit reaches a predetermined thyristor reverse-biasing voltage, the successive gate pulses are no longer supplied to the thyristor pair. Then, successive gate pulses are supplied to a next thyristor pair. The foregoing operation is repeated for successive thyristor pairs in a predetermined order until the period of oscillation of successive gate pulses supplied to the thyristor pairs is progressively shortened into conformity with a prescribed inverter oscillation period.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1A:
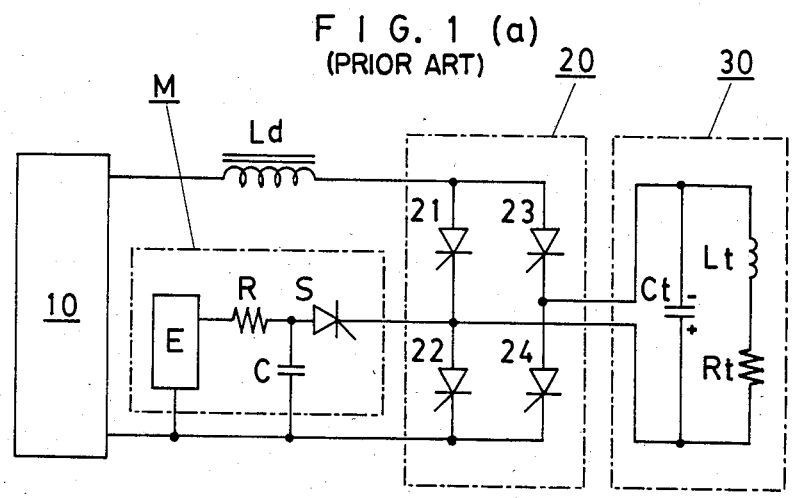
FIG. 1(a) is a circuit diagram of a conventional current-fed inverter having a starter.
Figure 1B:
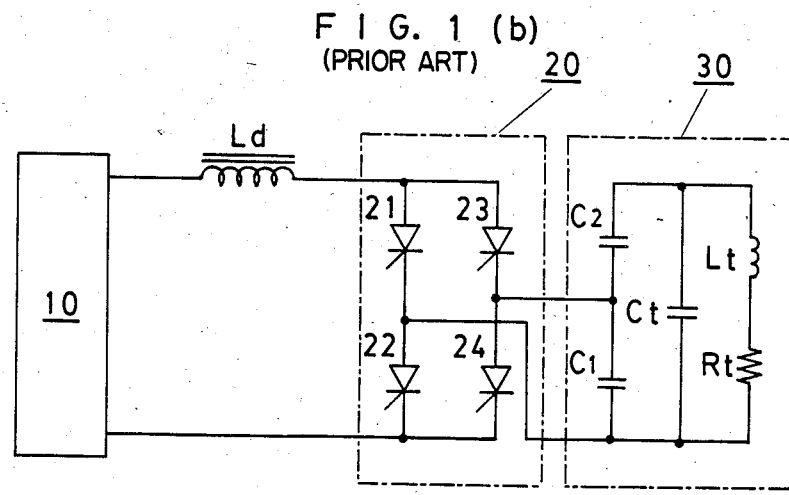
FIG. 1(b) is a circuit diagram of a conventional current-fed inverter having DC cut-off capacitors in an inverter load, to which inverter the present invention is applicable in principle.
Figure 2:
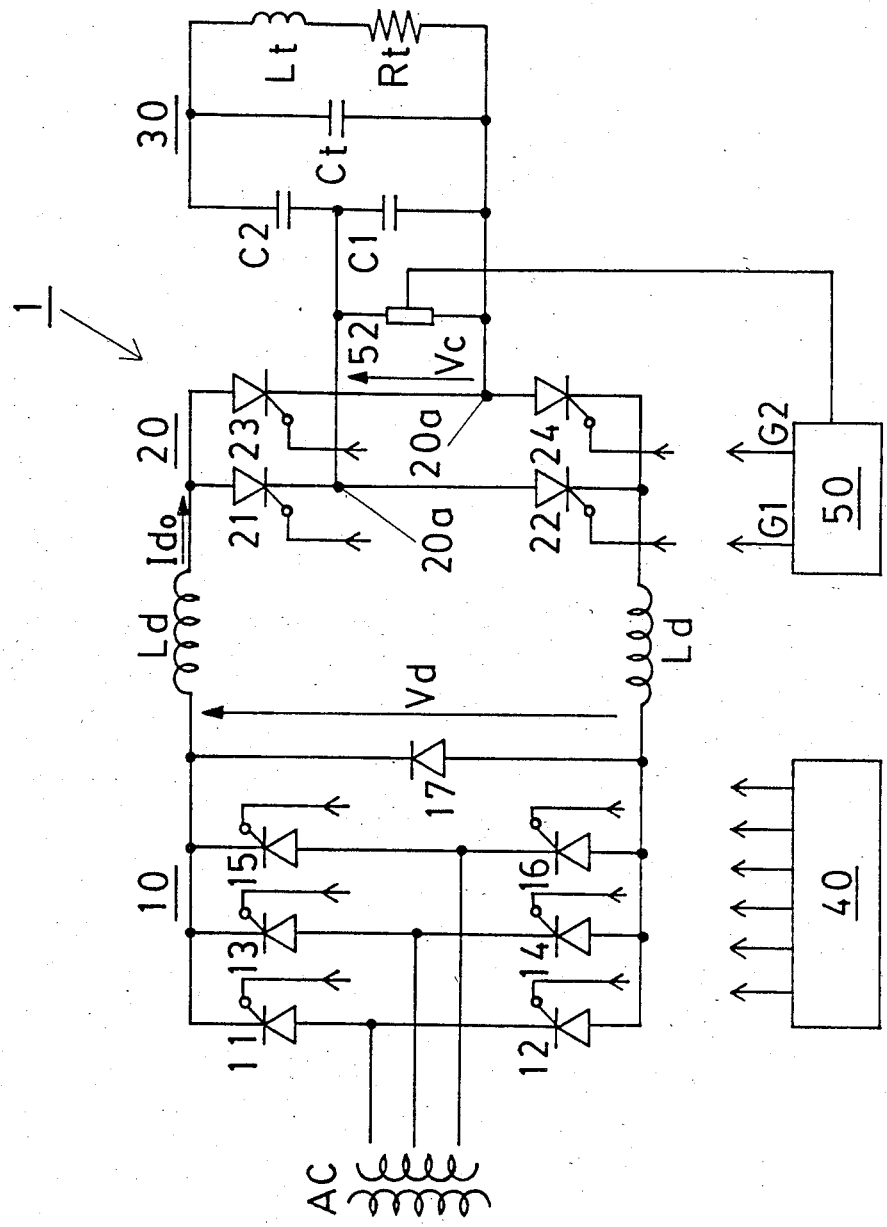
FIG. 2 is a circuit diagram of a circuit arrangement for effecting a method of starting a current-fed inverter with self-excitation.

The principles of the present invention are particularly suitable when embodied in a method of starting a current-fed inverter, generally designated at 1 in FIG. 2. The current-fed inverter 1 is powered by a three-phase AC power supply AC and comprises a phase-controlled power rectifier unit 10, DC reactors Ld, a frequency-controlled power inverter unit 20, and an inverter load 30.

The power rectifier unit 10 has a bridge circuit composed of six thyristors 11 through 16 and a flywheel diode 17 connected to the bridge circuit. The thyristors have gates supplied with gate pulses from a phase control unit 40. The power inverter unit 20 is composed of four bridge-connected thyristors 21 through 24 and supplied with a direct current Ido through a DC reactor Ld from the power rectifier 10 for supplying frequency-controlled AC power to the inverter load 30. The thyristors 21, 24 and 22, 23 of the power inverter unit 20 have gates supplied with gate pulses G1, G2, respectively, from a frequency control unit 50. The inverter load 30 includes an equivalent inductance Lt and an equivalent resistance Rt of an induction heating coil and a workpiece, and a resonance capacitor Ct connected in parallel to the induction heating coil. The inverter load 30 also has DC cut-off capacitors C1, C2 connected in series to each other and parallel to the resonance capacitor Ct. The power inverter unit 20 has AC output terminals 20a, 20a connected across the capacitor C1.

Figure 3:
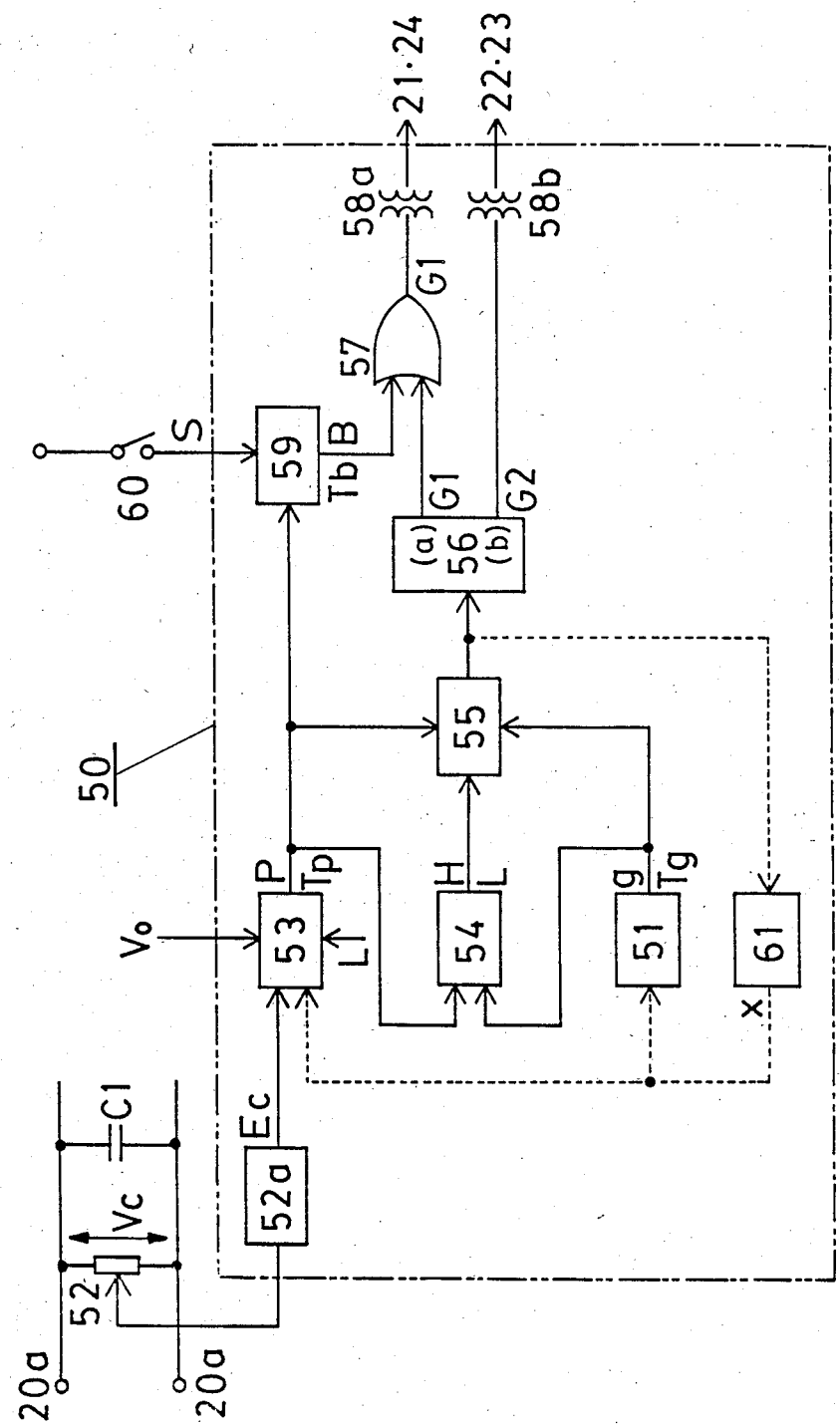
FIG. 3 is a block diagram of a frequency control unit in the circuit arrangement shown in FIG. 2.

The frequency control unit 50 will now be described with reference to FIGS. 2 and 3. The frequency control unit 50 includes a reference pulse generator 51 for generating pulses g having a period of oscillation $Tg = \frac{1}{2}/fg$ (fg: inverter oscillation frequency). A voltage detector 52 serves to detect a voltage appearing between the AC output terminals 20a, 20a of the power inverter unit 20, that is, a voltage Vc across the capacitor C1; the detected voltage is supplied to a full-wave diode rectifier 52a. The full-wave diode rectifier 52a outputs a DC voltage Ec having a level corresponding to the magnitude of the voltage Vc to a voltage comparator 53. The voltage comparator 53 compares the DC voltage Ec with a preset voltage Vo, and outputs pulses P (having a pulse oscillation Tp) when Ec=Vo. The preset voltage Vo is selected to be of a level not lower than a reverse biasing voltage required for turning off the thyristors 21 through 24. A timing comparator 54 is supplied with the pulses P from the voltage comparator 53 and pulses g from the reference pulse generator 51. When the oscillation period Tp of the pulses P is larger than the oscillation period Tg of the pulses g, that is, Tp>Tg, the timing comparator 54 outputs a selection command signal "H" to a pulse discriminator 55. When Tp<Tg, the timing comparator 54 outputs a selection command signal "L" to the pulse discriminator 55. The pulse discriminator 55 is supplied with the pulses g from the pulse generator 51 and the pulses P from the voltage comparator 53. The pulse discriminator 55 selects and supplies the pulses P to a pulse distributor 56 when the selection command signal "H" is supplied to the pulse discriminator 55, and selects and supplies the pulses g to the pulse distributor 56 when the selection command signal "L" is supplied to the pulse discriminator 55. Each time a pulse is supplied, the pulse distributor 56 alternately issues the gate pulses G1, G2 through output terminals (a), (b). The pulse distributor 56 will issue the gate pulse G2 as a first output. The gate pulses G1 are supplied through an OR gate 57 and a pulse transformer 58a to the gates of the thyristors 21, 24, and the gate pulses G2 are supplied through a pulse transformer 58b to the gates of the thyristors 22, 23. A burst circuit 59 serves to generate burst pulses B having an oscillation period Tb much shorter than the oscillation period Tg of the pulses g for a prescribed interval of time Tb in response to a starting signal S fed through an inverter starter switch 60. The burst circuit 59 stops the generation of the burst pulses B when the pulses P from the voltage comparator 53 are applied as a reset signal. The burst pulses B are applied through the OR gate 57 and the pulse transformer 58a to the gates of the thyristors 21, 24. A synchronizing circuit 61 supplied a synchronizing signal x to the pulse generator 51 and the voltage comparator 53.

Figure 4:
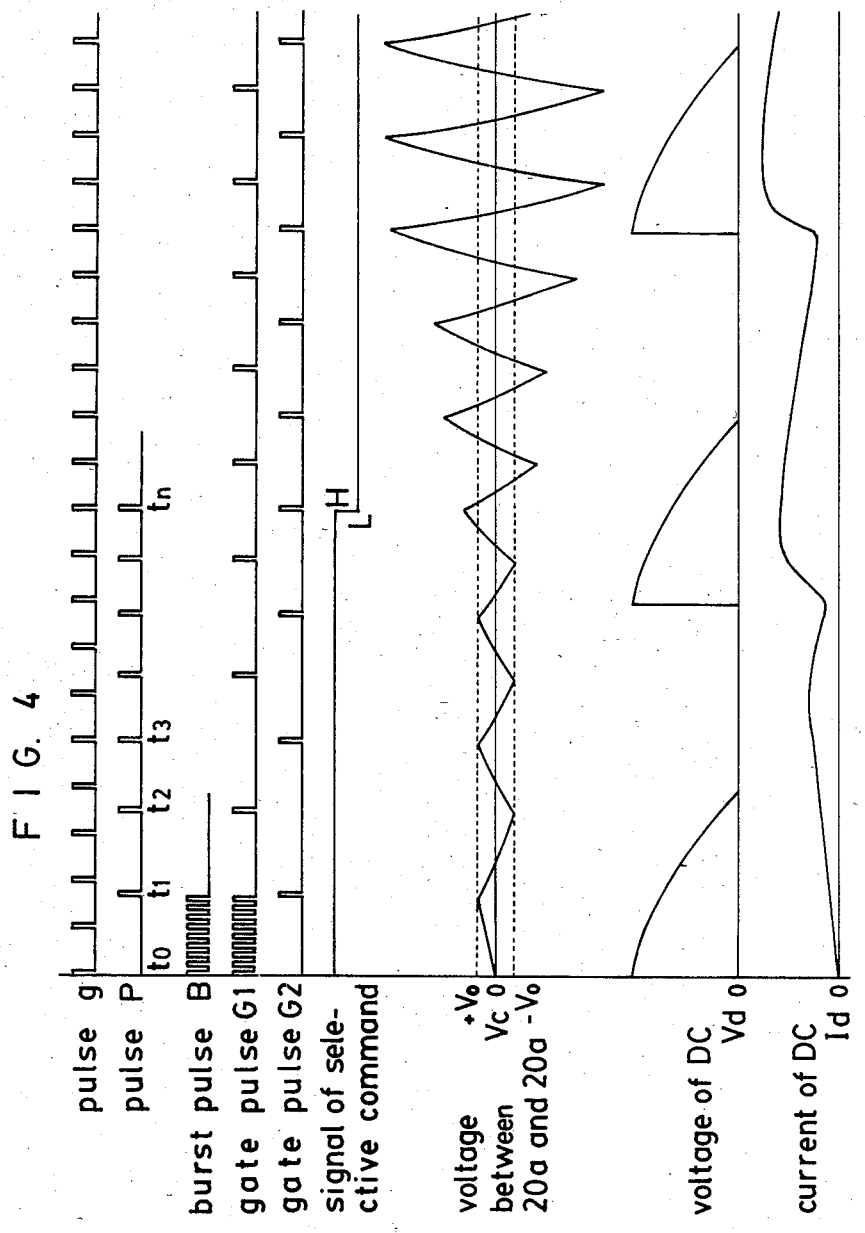
FIG. 4 is a timing chart of waveforms explanatory of operation of the circuit arrangement of FIG. 2.

Operation of the frequency control unit 50 thus constructed will be described with reference to the timing chart of FIG. 4. Designated in FIG. 4 at Vd is a DC voltage generated by the power rectifier 10.

Figure 5A:
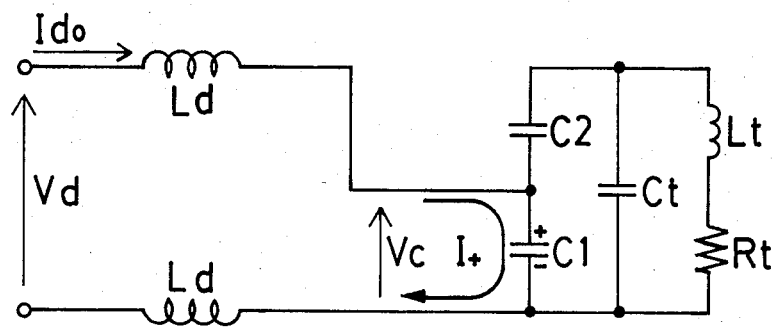
FIG. 5(a) and 5(b) are circuit diagrams of equivalent circuits of the circuit arrangement of FIG. 2.

It is assumed that the starter switch 60 is turned on at a time to and simultaneously the power rectifier 10 starts rectifying operation in response to gate pulses fed from the phase control unit 40 in a prescribed phase relationship and the frequency control unit 50 starts oscillating operation. When the starter switch 60 is closed, a starting signal S is fed into the burst circuit 59 which then issues pulses B. The first pulse B is fed as a gate pulse G1 through the OR gate 57 to turn on the thyristors 21, 24. FIG. 5(a) shows an equivalent circuit of the major inverter circuit arrangement at the time the thyristors 21, 24 are turned on. At this time, a voltage of illustrated polarity appears between the AC output terminals 20a, 20a. Since a direct current Ido issued from the power rectifier unit 10 is suppressed by the DC reactors Ld and then fed into the power inverter unit 20, an insufficient current (latching current) is supplied to the thyristors 21, 24 to keep the latter turned on. When the first pulse B disappears, both thyristors 21, 24 are turned off. The oscillation period Tb of the pulses B is short, and hence the second pulse B is supplied to the thyristors 21, 24 a quite short time after the first pulse B has disappeared, whereupon the thyristors 21, 24 are turned on again to develop the voltage of illustrated polarity between the AC output terminals 20a, 20a. At this time, a slightly greater current flows than the previous current, but the current still fails to reach the latching current, so that the thyristors 21, 24 will be de-energized upon removal of the pulse B. The thyristors 21, 24 repeat the foregoing on-off operation each time a pulse B is supplied, with the result that the level of a turn-on current for the thyristors 21, 24, that is, a current I+ flowing into the inverter load 30 is progressively increased. The current I+ flowing into the inverter load 30 is prevented by the DC cut-off capacitors C1, C2 from going toward the induction heating coil and the workpiece, but charges the capacitor C1. When the thyristors 21, 24 are turned off, no circuit is completed for discharging the capacitor C1, and hence the charge stored in the capacitor C1 remains stored therein. Accordingly, the capacitor C1 is charged by the current I+ flowing into the inverter load 30 each time the thyristors 21, 24 are energized, raising the voltage Vc across the capacitor C1. The pulses B are successively output until the current I+ flowing into the inverter load 30 exceeds the level of the latching current.

Figure 5B:
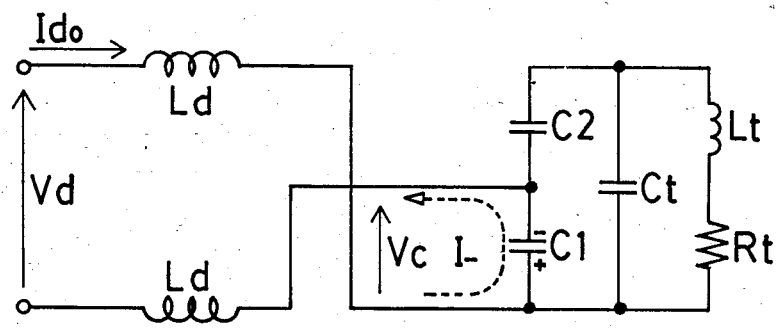

When the voltage Vc across the capacitor C1 reaches a preset voltage Vo at a time t1, the first pulse P is output from the voltage comparator 53 and simultaneously the burst circuit 59 stops its oscillating operation. At this time, since Tp>Tg, the timing comparator 54 generates a selection command signal "H", and the pulse discriminator 55 supplies the pulse P to the pulse distributor 56. Since the pulse distributor 56 issues a gate pulse G2 in response to the first pulse applied, the thyristors 22, 23 are turned on in response to the gate pulse G2 when the first pulse P is produced. At the same time, the voltage Vc across the capacitor C1 is supplied to the thyristors 21, 24 in opposite polarity. FIG. 5(b) shows an equivalent circuit of the major inverter circuit arrangement at the time the thyristors 22, 23 are turned on. The voltage Vc across the capacitor C1 is high enough to reverse-bias the thyristors 21, 24, which are then turned off reliably. When the thyristors 22, 23 are turned on, a voltage having opposite polarity to that shown in FIG. 5(a) appears between the AC output terminals 20a, 20a. Upon lapse of a certain period of time, a negative current I− starts flowing into the inverter load 30 to charge the capacitor C1 in opposite polarity.

The direct current Ido flowing through the DC reactors Ld into the power inverter unit 20 is increased with time. Therefore, the voltage Vc across the capacitor C1 reaches the preset voltage in a period of time t1−t2, shorter than a period of time to−t1, whereupon the voltage comparator 53 issues a pulse P. This pulse P is discriminated by the pulse discriminator 55 and fed to the pulse distributor 56, which then issues a gate pulse G1 to energize the thyristors 21, 24. Simultaneously, the thyristors 22, 23 are turned off as they are reversely biased by the voltage Vc across the capacitor C1. The capacitor C1 is then charged again in the polarity shown in FIG. 5(a). Thereafter, the sets of thyristors 21, 24 and 22, 23 are alternately turned on in response to the gate pulses G1, G2, respectively. Since the time required for the voltage Vc to reach the preset voltage Vo is progressively shortened with time, the oscillation period Tp of the pulses P approaches the oscillation period Tg of the pulses g until the periods are equalized to each other.

When TP=Tg, the timing comparator 54 which has generated the selection command signal "H" now outputs a selection command signal "L". The pulse discriminator 55 now selects and supplies the output g from the pulse oscillator 51 to the pulse distributor 56. The voltage comparator 53 stops the issuance of the pulses P in response to the selection command signal "L" supplied as a reset signal. The starting operation of the inverter is now completed, and the inverter will hereinafter be in operation at the inverter oscillation frequency fg.

Figure 7:
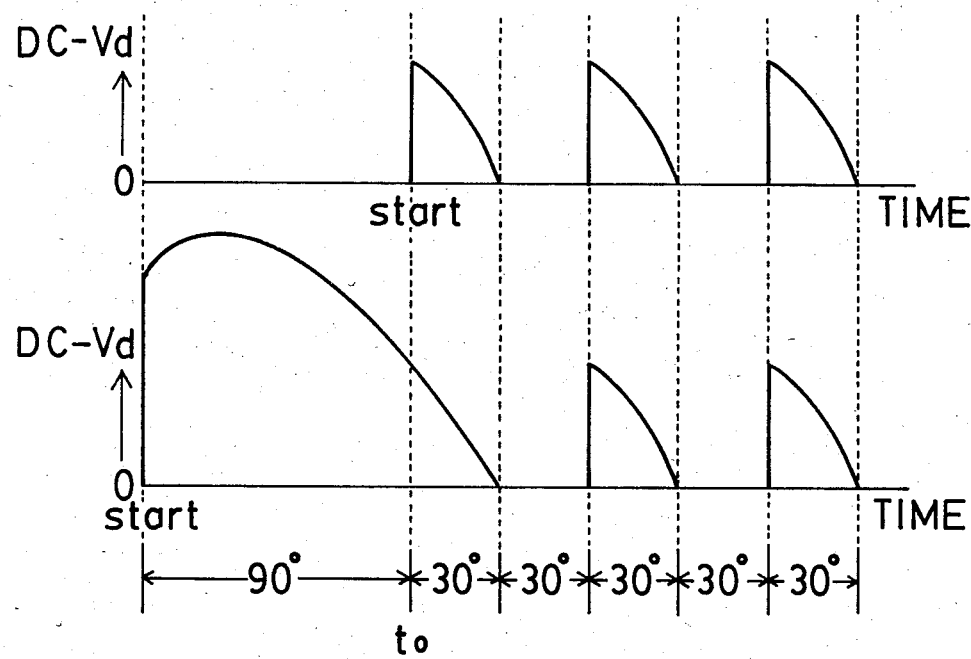
FIG. 7 is a diagram showing DC voltage waveforms illustrative of another embodiment of the present invention.

In the illustrated embodiment, the inverter is started with the phase control angle for the power rectifier 10 being fixed at a large value. By advancing the phase at which the first gate pulse is generated by the phase control unit 40 in the range of from 0° to 90°, as shown in FIG. 7, with respect to the phase in the arrangement of FIG. 4, the DC voltage Vd at an initial stage of the inverter starting operation is increased, to speed up the rising of the current flowing into the power inverter unit 30, so that the time required for starting the inverter can be reduced.

Figure 6:
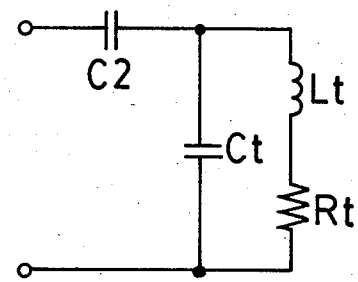
FIG. 6 is a circuit diagram of another inverter load.

The inverter load 30 may be of a construction as shown in FIG. 6 in which the DC cut-off capacitor C1 is dispensed with. By utilizing the voltage across the capacitor C2, the arrangement of FIG. 6 operates in the same manner and is as advantageous as the arrangement of the preceding embodiment.

The period of time during which the pulses B are output from the burst circuit 59 may be determined in advance through experiments.

With the arrangement of the invention, as described above, thyristors of a power inverter unit are turned on by a gate pulse which is supplied each time the voltage across a DC cut-off capacitor is increased up to a reverse biasing voltage necessary for the thyristors. The thyristors can therefore reliably be turned off even if the inverter oscillation frequency is high. The inverter can be started more reliably than conventional inverters. Since no separate starter is required, the inverter is smaller in size and less costly than prior inverters.

Although certain preferred embodiments have been shown and described, it should be understood that many changes and modifications may be made therein without departing from the scope of the appended claims.

What is claimed is:

1. A method of starting a current-fed inverter with self-excitation for supplying AC power to an inverter load having a DC cut-off capacitor, the current-fed inverter having a power inverter unit composed of a plurality of thyristors and having AC output terminals, said starting method comprising the steps of:
    (a) applying successive gate pulses to a pair of the plurality of thyristors from a time when a starting signal is generated at least until a turn-on current for the pair of thyristors exceeds a latching current;
    (b) detecting a voltage between the AC output terminals and comparing the detected voltage with a preset voltage corresponding to a thyristor reverse-biasing voltage;
    (c) generating a pulse each time the detected and preset voltages are equal to each other; and
    (d) supplying gate pulses in synchronism with the generated pulses to the thyristors of the power inverter unit in a prescribed order until a period of oscillation of the gate pulses is equal to a predetermined inverter oscillation period.

2. A method according to claim 1, wherein the first pulse of the gate pulses supplied to the thyristors of the power inverter is arranged so as to maximize an initial DC voltage within the current-fed inverter output by the thyristors.

3. A method according to claim 1, wherein the step of applying successive gate pulses comprises supplying a burst of gate pulses from a burst pulse generator such that the period of the burst of pulses is much shorter than the inverter oscillator period.

* * * * *